United States Patent
Watanabe et al.

(10) Patent No.: US 11,752,559 B2
(45) Date of Patent: Sep. 12, 2023

(54) CUBIC BORON NITRIDE SINTERED MATERIAL AND CUTTING TOOL INCLUDING SAME

(71) Applicants: SUMITOMO ELECTRIC INDUSTRIES, LTD., Osaka (JP); SUMITOMO ELECTRIC HARDMETAL CORP., Hyogo (JP)

(72) Inventors: Yuichiro Watanabe, Osaka (JP); Katsumi Okamura, Osaka (JP); Akito Ishii, Osaka (JP); Yoshiki Asakawa, Hyogo (JP); Akihiko Ueda, Hyogo (JP); Satoru Kukino, Hyogo (JP); Hisaya Hama, Hyogo (JP)

(73) Assignees: Sumitomo Electric Industries, Ltd., Osaka (JP); SUMITOMO ELECTRIC HARDMETAL CORP., Hyogo (JP)

(*) Notice: Subject to any disclaimer, the term of this patent is extended or adjusted under 35 U.S.C. 154(b) by 0 days.

(21) Appl. No.: 18/018,087

(22) PCT Filed: Jul. 30, 2021

(86) PCT No.: PCT/JP2021/028502
§ 371 (c)(1),
(2) Date: Jan. 26, 2023

(87) PCT Pub. No.: WO2022/025292
PCT Pub. Date: Feb. 3, 2022

(65) Prior Publication Data
US 2023/0211422 A1 Jul. 6, 2023

(30) Foreign Application Priority Data
Jul. 31, 2020 (JP) .................. 2020-130672

(51) Int. Cl.
*B23B 27/14* (2006.01)
(52) U.S. Cl.
CPC ...... *B23B 27/148* (2013.01); *B23B 2226/125* (2013.01)
(58) Field of Classification Search
None
See application file for complete search history.

(56) References Cited

U.S. PATENT DOCUMENTS 9,120,707 B2 * 9/2015 Matsuda ............. C04B 35/5831
2008/0214383 A1 9/2008 Matsukawa et al.
(Continued)

FOREIGN PATENT DOCUMENTS

| WO | 2005/066381 A1 | 7/2005 |
| WO | 2012/053507 A1 | 4/2012 |
| WO | 2019/155749 A1 | 8/2019 |

*Primary Examiner* — Pegah Parvini
*Assistant Examiner* — Ross J Christie
(74) *Attorney, Agent, or Firm* — Renner, Otto, Boisselle & Sklar, LLP

(57) ABSTRACT

The cubic boron nitride sintered material is a cubic boron nitride sintered material comprising: cubic boron nitride particles in an amount of 70 vol % or more and less than 100 vol %, and a bonding material, wherein the bonding material includes an aluminum compound, and includes cobalt as a constituent element; the cubic boron nitride sintered material has a first region in which a space between adjacent cubic boron nitride particles is 0.1 nm or more and 10 nm or less; and when the first region is analyzed by using an energy dispersive X-ray analyzer equipped with a transmission electron microscope, the atom % of aluminum in the first region is 0.1 or more.

20 Claims, 2 Drawing Sheets

(56) References Cited

U.S. PATENT DOCUMENTS

2012/0230786 A1 9/2012 Matsuda et al.
2020/0156213 A1 5/2020 Ishii et al.

* cited by examiner

US 11,752,559 B2

CUBIC BORON NITRIDE SINTERED MATERIAL AND CUTTING TOOL INCLUDING SAME

TECHNICAL FIELD

The present disclosure relates to a cubic boron nitride sintered material and a cutting tool including the same. The present application claims priority based on Japanese Patent Application No. 2020-130672 filed on Jul. 31, 2020. The contents described in the Japanese Patent Application are incorporated herein by reference in its entirety.

BACKGROUND ART

As a high hardness material used for cutting tools and the like, a cubic boron nitride sintered material (hereinafter, also referred to as the "cBN sintered material") is known. cBN sintered material usually includes cubic boron nitride particles (hereinafter, also referred to as the "cBN particles") and a bonding material, and the characteristics thereof tend to be different depending on the content ratio of cBN particles.

Hence, in the field of cutting and processing, different types of cBN sintered materials are applied to cutting tools and used depending on the material of the work materials, processing accuracy to be required, and the like. For example, cBN sintered material having a high content ratio of cubic boron nitride (hereinafter, also referred to as "cBN") (hereinafter, also referred to as the "High-cBN sintered material") can be suitably used for cutting of sintered alloys and the like.

However, the High-cBN sintered material tends to generate unexpected chipping. This is considered to be because the binding force between cBN particles is weak, so that cBN particles are dropped off. For example, WO 2005/066381 (PTL 1) discloses a technique of suppressing the generation of unexpected chipping in the High-cBN sintered material by suitably selecting the bonding material.

CITATION LIST

Patent Literature

PTL 1: WO 2005/066381

SUMMARY OF INVENTION

The cubic boron nitride sintered material according to one aspect of the present disclosure is a cubic boron nitride sintered material including: cubic boron nitride particles in an amount of 70 vol % or more and less than 100 vol %, and a bonding material, wherein the bonding material contains an aluminum compound, and contains cobalt as a constituent element; the cubic boron nitride sintered material has a first region in which the space between adjacent cubic boron nitride particles is 0.1 nm or more and 10 nm or less, and when the first region is analyzed by using an energy dispersive X-ray analyzer equipped with a transmission electron microscope, the atom % of aluminum in the first region is 0.1 or more.

The cutting tool according to one aspect of the present disclosure includes the cubic boron nitride sintered material.

DETAILED DESCRIPTION

Figure 1:
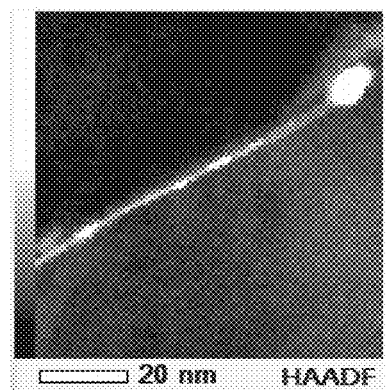
FIG. 1 is one example of a second image obtained from a cBN sintered material according to the present embodiment.

Problem to be Solved by the Present Disclosure

In recent years, as machinery parts having higher functions have been rapidly developed, it has become more difficult to cut work materials that are formed into machinery parts, at an accelerating pace. In response to this, the problem of an increase in cost due to the shortening of lifetime of cutting tools becomes obvious. Accordingly, a further improvement of the High-cBN sintered material is desired. In view of this, an object of the present disclosure is to provide a cubic boron nitride sintered material capable of prolonging the lifetime, and a cutting tool including thereof.

Advantageous Effect of the Present Disclosure

The present disclosure can provide a cubic boron nitride sintered material capable of prolonging the lifetime, and a cutting tool including thereof.

DESCRIPTION OF EMBODIMENTS

To solve the problem, the present inventors have come up with the achievement of prolongation of the lifetime by enhancing the binding force between cBN particles in the High-cBN sintered material. Then, the present inventors have intensively studied the cause of the weakened binding force between cBN particles in the High-cBN sintered material, and as a result, found that an oxygen layer (oxide film) present on the surface of cBN particles inhibits sintering between cBN particles and between a cBN particle and a bonding material.

Based on the finding, the present inventors have come up with the production of a structure of "cBN particle/Al layer (hereinafter, also referred to as the "adhesion layer")/cBN particle" between adjacent cBN particles by allowing Al which has higher reactivity with cBN particles than with oxygen to be present in the periphery of cBN particles, and sintering the cBN particles and a bonding material. Since the adhesion layer has a binding force stronger than the binding force between cBN particles covered with the oxide film, the structure can suppress dropping and the like of cBN particles during cutting, and thus the present inventors have arrived at the present disclosure that enables prolongation of the lifetime. Further, it has also been found that the adhesion layer has an effect of lessening the thermal shrinkage caused by the heat generated during cutting and thus suppresses the thermal cracking, so that the stability against chipping is significantly improved in the present disclosure. Hereinafter, the embodiments of the present disclosure will be first listed and described.

[1] The cubic boron nitride sintered material according to one aspect of the present disclosure is a cubic boron nitride sintered material including: cubic boron nitride particles in an amount of 70 vol % or more and less than 100 vol %, and a bonding material, wherein the bonding material contains an aluminum compound, and contains cobalt as a constituent element; and the cubic boron nitride sintered material has a first region in which the space between adjacent cubic boron nitride particles is 0.1 nm or more and 10 nm or less; and when the first region is analyzed by using an energy dispersive X-ray analyzer equipped with a transmission electron microscope, an atom % of aluminum in the first region is 0.1 or more. When the cubic boron nitride sintered material having such features is applied to a cutting tool, prolongation of the lifetime of the cutting tool can be achieved.

[2] When the space between adjacent cubic boron nitride particles in the first region is 0.1 nm or more and 7.0 nm or less, the atom % of aluminum in the first region is preferably 0.5 or more. Consequently, prolongation of the lifetime of the cutting tool can be more sufficiently achieved.

[3] The first region preferably includes, as constituent elements, at least one or more first elements selected from the group consisting of chromium, titanium, vanadium, cobalt, zirconium, tungsten, niobium, hafnium, tantalum, rhenium, silicon, and molybdenum; and aluminum, and when the first region is analyzed by using the energy dispersive X-ray analyzer equipped with a transmission electron microscope, a ratio M1/(M+M1) is preferably 0.50 or less where the atom % of aluminum is taken as M and the atom % of an element that is present at the highest concentration among the first elements is taken as M1. Consequently, prolongation of the lifetime of the cutting tool can be more sufficiently achieved.

[4] The ratio M1/(M+M1) is preferably 0.010 or more and 0.30 or less. Consequently, prolongation of the lifetime of the cutting tool can be further sufficiently achieved.

[5] The cubic boron nitride sintered material preferably contains the cubic boron nitride particles in an amount of 80 vol % or more and 95 vol % or less. Consequently, prolongation of the lifetime of a cutting tool can be achieved with the cubic boron nitride sintered material having a significantly high content of cBN particles.

[6] The cutting tool according to one aspect of the present disclosure includes the cubic boron nitride sintered material. The cutting tool having such a feature can achieve prolongation of the lifetime.

Details of Embodiments of the Present Invention

Hereinafter, one embodiment of the present invention (hereinafter, also referred to as the "present embodiment") will be described. However, the present embodiment is not limited to these. As used herein, the description of a form of "A to B" means the upper and lower limits of the range (that is, A or more and B or less), and when the unit is not described with respect to A and the unit is only described with respect to B, the unit of A is identical to the unit of B. Further, when a compound and the like are represented by a chemical formula in the present specification, unless the atomic ratio is not particularly limited, any conventionally known atomic ratio is included and is not necessarily limited to the stoichiometric range.

[Cubic Boron Nitride Sintered Material (cBN Sintered Material)]

The cubic boron nitride sintered material (cBN sintered material) according to the present embodiment is a cBN sintered material including cubic boron nitride particles (cBN particles) in an amount of 70 vol % or more and less than 100 vol %, and a bonding material. The bonding material contains an aluminum compound (Al compound), and contains cobalt (Co) as a constituent element. cBN sintered material has a first region in which the space between adjacent cBN particles is 0.1 nm or more and 10 nm or less. When the first region is analyzed by using an energy dispersive X-ray analyzer equipped with a transmission electron microscope (hereinafter, also referred to as "TEM-EDX"), the atom % of aluminum (Al) in the first region is 0.1 or more. When cBN sintered material having such features is applied to a cutting tool, prolongation of the lifetime of the cutting tool can be achieved.

<Cubic Boron Nitride Particles (cBN Particles)> cBN sintered material according to the present embodiment includes, as described above, cBN particles in an amount of 70 vol % or more and less than 100 vol %. cBN sintered material preferably includes cBN particles in an amount of 70 vol % or more and 99 vol % or less, and further preferably in an amount of 80 vol % or more and 95 vol % or less. That is, cBN sintered material is a so-called High-cBN sintered material. cBN particles have high hardness, strength, and toughness, and play a role as the skeleton in cBN sintered material. The content (vol %) of cBN particles in cBN sintered material is substantially identical to the content (vol %) of cBN raw material powder (coated cBN powder) used in the mixed powder described below. This is because, although substances in a capsule into which the mixed powder is inserted may be molten during ultra-high pressure sintering, the amount of the molten substance is a trace, and the content of cBN particles in cBN sintered material can be considered to be substantially identical to the content of cBN particles in the mixed powder. Thus, the content of cBN particles in cBN sintered material can be adjusted to the desired range by controlling the content of cBN raw material powder used in the mixed powder.

The content (vol %) of cBN particles in cBN sintered material can be assessed by subjecting cBN sintered material to quantitative analysis by inductively coupled plasma spectrometry (ICP), tissue observation, elemental analysis, or the like using an energy dispersive X-ray analyzer (EDX) equipped with a scanning electron microscope (SEM) or EDX equipped with a transmission electron microscope (TEM).

For example, when the SEM is used, the content (vol %) of cBN particles can be determined as follows. First, cBN sintered material is cut at any position to produce a sample including a cross section of cBN sintered material. For the production of the cross section, a focused ion beam system, a cross section polisher, or the like can be used. Then, the cross section is observed by the SEM at a magnification of 2,000 times to obtain a backscattered electron image. In the backscattered electron image, the region where cBN particles are present appears as a black region, and the region where the bonding material is present appears as a gray region or a white region.

Then, the backscattered electron image is subjected to binarization processing using an image analysis software (for example, "WinROOF" of MITANI CORPORATION), and each area ratio is determined from the image after the binarization processing. Then, by considering that the area ratio continues in the depth direction of the cross section, the area ratio can be determined as the content (vol %) of cBN particles in cBN sintered material. Note that, the content (vol %) of the bonding material described below can be determined by this measurement method, at the same time.

The $D_{50}$ (mean particle size) of cBN particles based on the area is not particularly limited, and for example, may be 0.1 to 10 μm. Usually, there are tendencies that the smaller the $D_{50}$, the higher the hardness of cBN sintered material, and the smaller the dispersion of the particle size, the more homogeneous the properties of cBN sintered material. The $D_{50}$ of cBN particles is preferably 0.5 to 4 μm.

The $D_{50}$ of cBN particles can be determined as follows. First, a sample including the cross section of cBN sintered material is produced according to the method for measuring the content of cBN particles described above to obtain a backscattered electron image. Then, the equivalent circle diameter of each black region in the backscattered electron image is calculated using the image analysis software. In this case, it is preferable to calculate equivalent circle diameters of 100 or more cBN particles by observing 5 or more fields of view.

Then, the cumulative distribution is determined by arranging each equivalent circle diameter from the minimum value to the maximum value in ascending order. The particle size at which the cumulative area is 50% in the cumulative distribution is $D_{50}$. The equivalent circle diameter means the diameter of a circle having an area equal to the area of cBN particle measured.

<Bonding Material. Composition Other than cBN Particles> cBN sintered material according to the present embodiment includes the bonding material as described above. Further, cBN sintered material may include inevitable impurities due to the raw material to be used, manufacturing conditions, and the like. In this case, cBN sintered material is composed of cBN particles, the bonding material, and inevitable impurities. The content (vol %) of the bonding material is preferably more than 0 vol % and 30 vol % or less, and more preferably 5 to 20 vol %. The bonding material plays a role to enable cBN particle which is a sintering resistant material to be sintered at an industrial-level pressure temperature.

The bonding material contains an Al compound, and also contains Co as a constituent element. The bonding material "containing Co as a constituent element" means that the bonding material at least contains any of a metal simple substance of Co, a Co alloy, or a mutual solid solution of Co and at least one selected from the group consisting of carbon, nitrogen, and oxygen. Examples of the Al compound include CoAl, $Al_2O_3$, AlN, and $AlB_2$, and composite compounds thereof. In particular, the bonding material preferably contains WC (tungsten carbide), both or either of a metal simple substance of Co and a Co alloy, and the Al compound. These components in the bonding material are considered to be particularly effective to prolong the lifetime of cBN sintered material for the following reasons.

First, since Co and Al have catalytic functions, they can promote bonding between cBN particles in the sintering step described below. Second, WC is inferred to be effective to bring the coefficient of thermal expansion of the bonding material close to the coefficient of thermal expansion of cBN particles. Note that the catalytic function means a function of promoting diffusion and precipitation of B (boron) and N (nitrogen) constituting cBN particles through Co or Al.

The bonding material may contain other components other than WC, the Al compound, and Co as a constituent element. As other components of the bonding material, it is preferable to contain at least one or more elements selected from the group consisting of chromium (Cr), titanium (Ti), vanadium (V), zirconium (Zr), tungsten (W), niobium (Nb), hafnium (Hf), tantalum (Ta), rhenium (Re), silicon (Si), and molybdenum (Mo). By dissolving at least one or more elements selected from the above group in the Al compound to form a solid solution, a larger number of Al layers (adhesion layers) that are strongly bonded to cBN particles can be produced between adjacent cBN particles. From the viewpoint of preventing the reaction inhibition of Al and cBN, the content of at least one or more elements selected from the above group in the bonding material is preferably 50 atom % or less, and more preferably 30 atom % or less. Since at least one or more elements selected from the above group are a component for obtaining a preferred effect of the present disclosure, the lower limit value thereof may be 0 atom %. Here, in the present specification, the "Al layer (adhesion layer)" means a layer (region) containing Al as the bonding material component, among bonding material layers that occupy between adjacent cBN particles in cBN sintered material. Further, the "Al layer (adhesion layer)" means the first region described later, in some cases. The content (atom %) of at least one or more elements selected from the above group in the bonding material is determined on the basis that all the elements measured in the following XRD and ICP analyses are taken as 100 atom %.

The composition of the bonding material can be specified by combining XRD (X-ray diffraction measurement) and ICP. Specifically, first, a test specimen having a thickness of about 0.45 to 0.5 mm is cut out from cBN sintered material, and the test specimen is subjected to XRD analysis to determine the compound, metal, and the like determined from the X-ray diffraction peak. Next, the test specimen is immersed in fluonitric acid (a mixed acid mixed at a volume ratio of concentrated nitric acid (60%):distilled water:concentrated hydrofluoric acid (47%)=2:2:1) in a sealed container to obtain an acid treatment liquid in which the bonding material is dissolved. Further, the acid treatment liquid is subjected to ICP analysis to quantitatively analyze each metal element. Finally, the results of XRD and the results of ICP analysis are analyzed, so that the composition of the bonding material can be determined.

Examples of the inevitable impurities that may be contained in cBN sintered material according to the present embodiment include iron, magnesium, calcium, sodium, and lithium. The inevitable impurities may be contained in cBN sintered material in an amount of 0.01 mass % or less as a single impurity, or may be contained in an amount of 0.1 mass % or less as the total sum of impurities. In the present specification, the "inevitable impurities" that may be contained in cBN sintered material shall be treated as a third component other than cBN and the bonding material.

<First Region> cBN sintered material according to the present embodiment has the first region in which the space between adjacent cBN particles is 0.1 nm or more and 10 nm or less. When the first region is analyzed by using an energy dispersive X-ray analyzer equipped with a transmission electron microscope (TEM-EDX), the atom % of Al in the first region is 0.1 or more. The first region is a region formed in the region where the bonding material is present in cBN sintered material.

(Analysis by TEM-EDX)

The first region can be specified by analyzing the region where a structure of "cBN particle/bonding material layer/cBN particle" (hereinafter, also referred to as "the first structure") is formed by cBN particles adjacent to each other in cBN sintered material, using TEM-EDX. Hereinafter, the method for specifying the first region by TEM-EDX will be described.

First, a sample is collected from cBN sintered material, and a sliced piece having a thickness of 30 to 100 nm is produced from the sample using an argon ion slicer. Then, the piece is photographed by TEM (transmission electron microscope) at a magnification such that 10 or more and 30 or less cBN particles can be observed in one field of view, thereby obtaining a first image. Further, in the first image, any one region where a structure like an interface of cBN particles is formed by the cBN particles adjacent to each other is selected. At this time, the region where the structure like an interface of cBN particles is inclined in the depth direction with respect to the observed field of view is excluded from the selection, or the structure like an interface of cBN particles inclined in the depth direction is set to be perpendicular to the observed field of view by finely adjusting the piece. This is because the measurement of the distance between particles D described later and the elemental line analysis described later may not be suitably conducted in the state where the structure like an interface of cBN particles is inclined in the depth direction with respect to the observed field of view. Next, positioning is carried out such that the region where the structure like an interface is formed passes near the center of the image, and the observation magnification is changed to 2,000,000 times for observation, thereby obtaining a second image having a size of 100 nm×100 nm. In the second image, the region where the structure like an interface is formed is present so as to extend from one end of the image to the other one end (another end) facing the one end while passing through near the center of the image, as the region where the first structure is formed.

Next, elemental line analysis is carried out in a direction perpendicularly crossing the region where the structure like an interface, which is determined in the second image, is formed to obtain a profile of HAADF image intensity. Further, the difference between the background and the peak value is determined in the profile, and subsequently, two points on the profile at which the value is half of the difference are extracted, and the distance between these two points is defined as the distance between particles D. The distance between particles D corresponds to the space between adjacent cBN particles. That is, since the region where the structure like an interface is formed is more largely (greatly) detected than the intensity of the region where cBN particles are present, in terms of HAADF image intensity, it can be used for the quantification of the space between adjacent cBN particles (distance between particles D). When the distance between particles D is 0.1 nm or more and 10 nm or less, the region is specified as the first region.

In the method for specifying the first region described above, the second images at 10 fields of view are preferably prepared for cBN sintered material used as the sample. In the present specification, the analysis described above is repeatedly carried out based on the second images at 10 fields of view, and when a portion where the distance between particles D is 0.1 to 10 nm is determined (that is, when the first region is observed) in the second images at at least six or more fields of view, cBN sintered material used as the sample is considered to have the first region.

Here, FIG. 1 is one example of the second image obtained from a cBN sintered material according to the present embodiment. With reference to FIG. 1, the black region corresponds to the region containing B and N as the main constituent elements (region where cBN particles are present), and the white region or the gray region corresponds to the region where bonding material components other than B and N are present. The entire second image corresponds to the "region where a structure like an interface of cBN particles is formed" selected from the first image.

Figure 2:
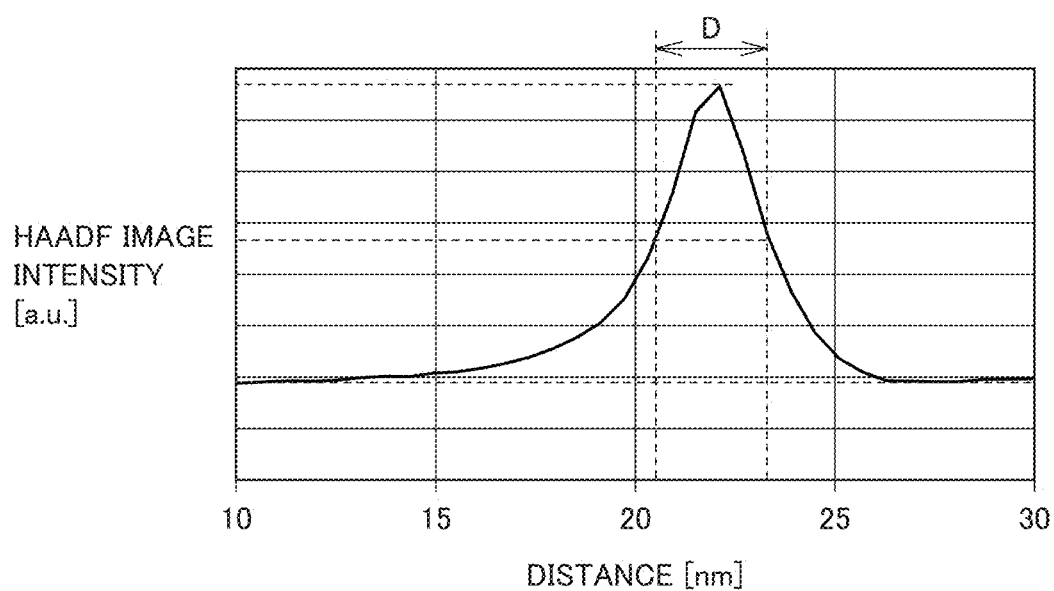
FIG. 2 is one example of a graph showing the results of elemental line analysis.

FIG. 2 is one example of a graph showing the results of elemental line analysis. In the graph, the distance (nm) of the elemental line analysis carried out is shown as the abscissa and the HAADF image intensity (a.u.) calculated from the results of the elemental line analysis is shown as the ordinate. The "distance D" shown in FIG. 2 means the "distance between particles D" obtained by determining the difference between the background and the peak value, and subsequently extracting two points on the profile at which the value is half of the difference.

(Atom % of Aluminum in First Region)

In cBN sintered material according to the present embodiment, when the first region is analyzed by using TEM-EDX, the atom % of Al in the first region is 0.1 or more. The value of atom % of Al can be determined from the results of the elemental line analysis on the second image described above. Specifically, as the value of atom % of Al, the maximum value of the Al peak excluding the background value obtained from the results of the elemental line analysis is employed. This is because when the Al peak area obtained as the atom % of Al by the elemental line analysis is employed, analysis errors are large. The atom % of Al in the first region is determined by taking all elements measured in the elemental line analysis as 100 atom %.

In the present specification, "the atom % of Al in the first region is 0.1 or more" means that the average value of atom % of Al in six or more first regions in which the distance between particles D is specified to be 0.1 nm or more and 10 nm or less in the second images at 10 fields of view extracted from cBN sintered material used as the sample is 0.1 or more. The upper limit value of atom % of Al in the first region is not particularly limited. Any upper limit value may be taken as long as it is measurable. For example, the atom % of Al in the first region may be 50 or less, 30 or less, or 15 or less.

Here, when the space between adjacent cubic boron nitride particles in the first region is 0.1 nm or more and 7.0 nm or less in cBN sintered material according to the present embodiment, the atom % of Al is preferably 0.5 or more. When the atom % of Al in the first region is 0.5 or more, the binding force between cBN particles can be further enhanced. Consequently, when cBN sintered material is applied to a cutting tool, prolongation of the lifetime of the cutting tool can be more sufficiently achieved.

(Other Elements in First Region)

The first region preferably includes, as constituent elements, at least one or more first elements selected from the group consisting of chromium (Cr), titanium (Ti), vanadium (V), cobalt (Co), zirconium (Zr), tungsten (W), niobium (Nb), hafnium (Hf), tantalum (Ta), rhenium (Re), silicon (Si), and molybdenum (Mo); and Al. In this case, when the first region is analyzed using the energy dispersive X-ray analyzer equipped with a transmission electron microscope (TEM-EDX), the ratio M1/(M+M1) is preferably 0.50 or less where the atom % of Al is taken as M and the atom % of an element that is present at the highest concentration among the first elements is taken as M1. The ratio M1/(M+M1) is more preferably 0.010 or more and 0.30 or less. When cBN sintered material having such features is applied to a cutting tool, prolongation of the lifetime of the cutting tool can be more sufficiently achieved.

Here, in the present specification, "M1" in the ratio M1/(M+M1) means the value of atom % of an element that is present at the highest concentration in the first region among the first elements, as described above. Therefore, among the first elements included in the first region, not only the atom % of the element that is present at the highest concentration satisfies the relationship of the ratio M1/(M+M1) being 0.50 or less with respect to the atom % of aluminum, but also each first element satisfies the relationship of "atom % of first element/(atom % of first element+ atom % of aluminum) is 0.50 or less" with respect to the atom % of aluminum. Further, among the first elements included in the first region, the atom % of the element that is present at the highest concentration in the first region further preferably satisfies the relationship of the ratio M1/(M+M1) being 0.010 or more and 0.30 or less with respect to the atom % of aluminum. The first element included in the first region may be only one or two or more selected from the above group.

The value of the ratio M1/(M+M1) in the first region can be determined in the same manner as the determination of the value of atom % of Al in the first region. That is, based on the maximum value of the peak of the element that is present at the highest concentration in the first region among the first elements and the maximum value of the Al peak each obtained from the results of the elemental line analysis, the value of atom % of the element that is present at the highest concentration in the first region among the first elements (M1) and the value of atom % of Al (M) are determined. Then, the ratio M1/(M+M1) can be calculated by dividing M1 by the sum of M1 and M, (M+M1). In the present specification, "the ratio M1/(M+M1) is 0.50 or less (0.010 or more and 0.30 or less)" means that the average value of each value of the ratio M1/(M+M1) in six or more first regions in which the distance between particles D is specified to be 0.1 nm or more and 10 nm or less in the second images at 10 fields of view extracted from cBN sintered material used as the sample is 0.50 or less (0.010 or more and 0.30 or less).

<Action>

In cBN sintered material according to the present embodiment, the atom % of Al in the first region is 0.1 or more, as described above. In this case, although the detailed mechanism is unclear, it is inferred that the binding force between cBN particles is enhanced in cBN sintered material based on the following reasons, and thus prolongation of the lifetime is enabled. That is, the atom % of Al in the first region of 0.1 or more means that a high amount (a high concentration) of Al is contained in the first region (between adjacent cBN particles). When a high concentration of Al is present in the first region, a larger amount of Al having high reactivity with cBN particles can react with cBN particles during sintering. It is considered that many "cBN particle/Al layer (adhesion layer)/cBN particle" structures can be thereby produced between adjacent cBN particles, and thus the binding force between cBN particles can be enhanced.

Further, it is preferable that each element included in the group consisting of Cr, Ti, V, Co, Zr, W, Nb, Hf, Ta, Re, Si, and Mo is included in the first region to satisfy the relationship of the ratio M1/(M+M1) being 0.50 or less, because the hardness of the adhesion layer produced by sintering is improved. In this case, it is inferred that improvement of physical properties of the adhesion layer that joins cBN particles more sufficiently enhances the binding force between cBN particles and suppresses falling off and the like of cBN particles during cutting, and thus prolongation of the lifetime is enabled.

[Cutting Tool]

The cutting tool according to the present embodiment includes cBN sintered material. Specifically, the cutting tool preferably includes cBN sintered material as the base material. A part of or the whole surface of cBN sintered material to be the base material may be coated with a coating.

The shape and application of the cutting tool according to the present embodiment are not particularly limited. Examples of the shape and application of the cutting tool include drills, end mills, replaceable cutting tips for drills, replaceable cutting tips for end mills, replaceable cutting tips for milling, replaceable cutting tips for turning, metal slitting saws, gear cutting tools, reamers, taps, and tips for pin milling of crankshafts.

Further, the cutting tool according to the present embodiment includes not only those in which the whole tool is composed of cBN sintered material, but also those in which only a part of the tool (in particular, such as the cutting edge part (cutting blade portion)) is composed of cBN sintered material. For example, those in which only the cutting edge part of the base (support) composed of cemented carbide or the like is constituted by cBN sintered material are also included in the cutting tool according to the present embodiment. In this case, the cutting edge part can be literally regarded as a cutting tool. In other words, even when cBN sintered material occupies only a part of the cutting tool, cBN sintered material is referred to as the cutting tool.

The cutting tool according to the present embodiment may include a coating that at least coats the cutting edge part. In this case, a coating may be formed on the cutting edge part in cBN sintered material by a conventionally known method. Examples of the method for forming the coating include physical vapor deposition methods such as an ion plating method, an arc ion plating method, a sputtering method, and an ion mixing method. Further, a coating may also be formed by a chemical vapor deposition method. The composition of the coating is not particularly limited, and any conventionally known coating can be employed. Examples of the composition of the coating include AlTiSiN, AlCrN, TiZrSiN, CrTaN, HfWSiN, CrAlN, TiN, TiBNO, TiCN, TiCNO, $TiB_2$, TiAlN, TiAlCN, TiAlON, TiAlONC, and $Al_2O_3$.

Since including cBN sintered material, the cutting tool according to the present embodiment can suppress dropping and the like of cBN particles during cutting, and thus prolongation of the lifetime is enabled.

[Method for Manufacturing Cubic Boron Nitride Sintered Material]

The method for manufacturing cBN sintered material according to the present embodiment should not be particularly limited, as long as a cBN sintered material capable of prolonging the lifetime can be obtained when being applied to a cutting tool, as described above. However, from the viewpoint of yield and the like, it is preferable to obtain cBN sintered material, for example, by the following manufacturing method. The present inventors have found that cBN sintered material capable of prolonging the lifetime can be manufactured by preparing a raw material powder of a bonding material in which the amount of Al blended is increased as described later, applying a coating technique that is different from conventional techniques to the surface of the raw material powder of cBN particles, and the like, in a process for manufacturing cBN sintered material.

Specifically, the method for manufacturing cBN sintered material according to the present embodiment preferably includes a step of preparing a raw material powder for a bonding material in which the amount of Al blended is increased (first step), a step of coating the surface of a cBN raw material powder with a metal to obtain a coated cBN powder (second step), a step of mixing the raw material powder for the bonding material and the coated cBN powder to prepare a mixed powder including cBN powder in an amount of 70 vol % or more and less than 100 vol % and the balance of the raw material powder for the bonding material (third step), and a step of sintering the mixed powder to obtain a cBN sintered material (fourth step). Hereinafter, each step will be described in detail.

<First Step>

The first step is a step of preparing a raw material powder for a bonding material in which the amount of Al blended is increased. The raw material powder for the bonding material can be prepared by preparing as follows. First, for example, a WC powder, a Co powder, and an Al powder are manufactured by a conventionally known method or obtained from the market for preparation. Further, the raw material powder for the bonding material may contain other elements other than WC, Co, and Al, and it is preferable to prepare a powder including, as other elements, at least one or more elements selected from the group consisting of Cr, Ti, V, Zr, Nb, Hf, Ta, Re, Si, and Mo. Then, the powders described above are mixed to be a predetermined ratio, and subsequently pulverized by a wet ball mill, a wet bead mill, or the like to prepare the raw material powder for the bonding material.

It is preferable that the Al content in the raw material powder for the bonding material be 20 to 40 mass %, thereby increasing the amount of Al blended as compared with conventional bonding materials of this kind. Consequently, in the second step described later, the metal to be coated on the cBN surface, such as Al, is suppressed from diffusing in the bonding material during sintering. The method for mixing the powders is not particularly limited, but ball mill mixing, bead mill mixing, planetary mill mixing, or jet mill mixing is preferable from the viewpoint of efficiently and homogeneously mixing the powders. Each mixing method may be wet or dry.

<Second Step>

The second step is a step of coating the surface of a cBN raw material powder with a metal to obtain a coated cBN powder. As cBN raw material powder, commercially available cBN particles may be used, or a cBN powder obtained from B and N by a conventionally known ultra-high pressure synthesis method may be used. Here, it is preferable to subject the cBN raw material powder to heat treatment as the pretreatment, before the surface of the cBN raw material powder is coated with a metal. Specifically, the cBN raw material powder is heated in a nitrogen atmosphere with a low oxygen partial pressure to carry out reduction treatment for purification. The heat treatment temperature at this time is preferably 900 to 1,600° C. The heat treatment time is not particularly limited, as long as the heat treatment is continued until the surface of the cBN raw material powder is sufficiently purified, and for example, may be 1 to 20 hours. The oxygen partial pressure during reduction treatment is preferably a low oxygen partial pressure of $1 \times 10^{-29}$ atm or less. Purification of the cBN raw material powder can be sufficiently and efficiently progressed by carrying out the heat treatment under such a low oxygen partial pressure. Consequently, the oxidation of the cBN surface which is a factor of inhibiting the sintering can be suppressed and clean surfaces of cBN particles can be exposed, and thus the adhesiveness between the metal coated on the surface of the cBN raw material powder and cBN particles can be improved.

Then, in the second step, the surface of the cBN raw material powder is coated with a metal such as Al by using an arc plasma deposition method (APD method). Thus, the coated cBN powder can be obtained. By using the APD method, nanoparticles can be laminated on the surface of the cBN raw material powder unlike generally known coating means such as a sputtering method, an AIP method, and a CVD method, and it is thus possible to allow the metal to be present on the surface of the cBN raw material powder with a large surface area. With such a coated cBN powder, the binding reaction between cBN particles and metal is likely to be promoted during sintering, and the coating of the metal is hardly separated in the third step described later. Thus, a metal such as Al can be unevenly distributed between adjacent cBN particles and cBN sintered material in which the binding force between cBN particles is enhanced can be manufactured. The metal for coating the surface of the cBN raw material powder is preferably Al. Consequently, Al is easily selectively positioned between cBN particles. Further, in the second step, it is preferable to coat the cBN raw material powder with at least one or more elements selected from the group consisting of Cr, Ti, V, Co, Zr, W, Nb, Hf, Ta, Re, Si, and Mo (first elements) by using the same coating method. That is, it is preferable to coat the cBN raw material powder with one first element selected from the above group, and it is also preferable to coat the cBN raw material powder with two or more first elements. The value of the ratio M1/(M+M1) can be controlled by adjusting the coating amount of Al and the first element.

<Third Step>

The third step is a step of mixing the raw material powder for the bonding material and coated cBN powder to prepare a mixed powder including cBN powder in an amount of 70 vol % or more and less than 100 vol % and the balance of the raw material powder for the bonding material. Specifically, it is preferable in the third step that the raw material powder for the bonding material and coated cBN powder be mixed by wet ball mill using ethanol, acetone, or the like as a solvent to prepare the mixed powder. After preparation of the mixed powder, the solvent is removed by natural drying. Further, it is preferable to subject the mixed powder to heat treatment (for example, 850° C. or more under vacuum) because impurities such as the moisture adsorbed to the surface can be removed.

<Fourth Step>

The fourth step is a step of sintering the mixed powder to obtain a cBN sintered material. In this step, the mixed powder is sintered by being exposed to high temperature and high pressure conditions, so that cBN sintered material is manufactured. Specifically, in the fourth step, the vacuum-sealed mixed powder is subjected to sintering treatment by using an ultra-high temperature and high pressure apparatus. The temperature conditions for sintering treatment are preferably 1,500° C. or more and less than 2,000° C., and more preferably 1,600 to 1,900° C. The holding time is preferably 10 to 50 minutes. The sintering pressure conditions are not particularly limited, but are preferably 5.5 to 8 GPa. Thus, cBN sintered material can be manufactured.

<Effect>

The method for manufacturing cBN sintered material according to the present embodiment can manufacture a cBN sintered material capable of prolonging the lifetime by performing each step.

EXAMPLES

Hereinafter, the present invention will be described in more detail with reference to Examples, but the present invention is not limited to these.

[Production of Samples]

cBN sintered materials of sample 1 to sample 36 were produced in accordance with the following procedure.

<Sample 1>

(First Step)

First, a WC powder, a Co powder and an Al powder which are commercially available were prepared. Then, the powders described above were blended such that WC:Co:Al was 32:38:30 in a mass ratio. The mean particle size of the powders was 5 μm. Further, the powder blended in the mass ratio was pulverized by bead mill mixing to prepare a raw material powder for the bonding material.

(Second Step)

First, a commercially available cBN powder (mean particle size of 2 μm) was prepared as the cBN raw material powder. The cBN raw material powder was subjected to heat treatment. The heat treatment was carried out under extremely-low oxygen conditions of $1\times10^{-29}$ atm or less at a heat treatment temperature of 1,200° C. and a heat treatment time of 10 hours.

Then, for the cBN raw material powder after the heat treatment, the surface of the cBN raw material powder was coated with Al by the APD method under the following coating conditions to obtain a coated cBN powder.

<Coating Conditions>

Coating apparatus: nanoparticles forming apparatus APD-P manufactured by ADVANCE RIKO, Inc.
Target: 2 pieces of pure Al (purity: 99.999%) were used
Introduction gas: argon gas was introduced after vacuuming under $10^{-4}$ Pa, and the pressure in the apparatus was set to $10^{-1}$ Pa
Discharge voltage: 150 V
Discharge frequency: 5 Hz
Condenser capacity: 1,080 μF
Shot number: 10,000
Amount of powder treated: 25 g
Number of revolutions of powder container: 50 rpm.

(Third Step)

Coated cBN powder and the raw material powder for the bonding material were blended such that coated cBN powder:the raw material powder for the bonding material was 60:40 in a volume ratio, and uniformly mixed by a wet ball mill method using ethanol. Thereafter, the solvent was removed by natural drying, and the mixed powder was subjected to heat treatment under vacuum at 900° C. Thus, the mixed powder was prepared.

(Fourth Step)

The mixed powder was sintered to produce a cBN sintered material. Specifically, the mixed powder was charged in a container made of Ta (tantalum), and vacuum sealed. Then, this was sintered using a belt-type ultra-high pressure and high temperature generator under the conditions of 6.5 GPa and 1,700° C. for 15 minutes. Thus, cBN sintered material of sample 1 was produced.

<Sample 2> cBN sintered material of sample 2 was produced in the same manner as sample 1, except that, in the third step, blending was carried out such that coated cBN powder:raw material powder for the bonding material was 70:30 in a volume ratio.

<Sample 3> cBN sintered material of sample 3 was produced in the same manner as sample 1, except that, in the third step, blending was carried out such that coated cBN powder:the raw material powder for the bonding material was 75:25 in a volume ratio, and in the second step, the heat treatment temperature for the cBN raw material powder was set to 1,000° C., the heat treatment time was set to 12 hours, and the shot number of the coating conditions was set to 5000.

<Sample 4> cBN sintered material of sample 4 was produced in the same manner as sample 1, except that, in the third step, blending was carried out such that coated cBN powder:the raw material powder for the bonding material was 80:20 in a volume ratio.

<Sample 5> cBN sintered material of sample 5 was produced in the same manner as sample 1, except that, in the third step, blending was carried out such that coated cBN powder:the raw material powder for the bonding material was 89:11 in a volume ratio.

<Sample 6> cBN sintered material of sample 6 was produced in the same manner as sample 1, except that, in the third step, blending was carried out such that coated cBN powder:the raw material powder for the bonding material was 95:5 in a volume ratio.

<Sample 7> cBN sintered material of sample 7 was produced in the same manner as sample 1, except that, in the third step, blending was carried out such that coated cBN powder:the raw material powder for the bonding material was 99:1 in a volume ratio.

<Sample 8>

The commercially available cBN powder prepared in sample 1 as the cBN raw material powder was subjected to heat treatment under the conditions of $1\times10^{2}$ atm or less, 1,200° C., and 10 hours. This cBN raw material powder subjected to heat treatment was charged in a container made of Ta (tantalum) and vacuum sealed, and this was sintered using a belt-type ultra-high pressure and high temperature generator under the conditions of 6.5 GPa and 1,700° C. for 15 minutes. Thus, cBN sintered material of sample 8 was produced.

<Sample 9> cBN sintered material of sample 9 was produced in the same manner as sample 2, except that, in the second step, the cBN raw material powder was not subjected to heat treatment and coated with Al.

<Sample 10> cBN sintered material of sample 10 was produced in the same manner as sample 5, except that, in the second step, the surface of the cBN raw material powder subjected to heat treatment was not coated with Al.

<Sample 11> cBN sintered material of sample 11 was produced in the same manner as sample 6, except that, in the second step, the heat treatment conditions for the commercially available cBN powder prepared as the cBN raw material powder were set to 1,400° C. and 20 hours, and the surface of the cBN raw material powder subjected to heat treatment was coated with Al by setting the shot number in the coating conditions to 1,000.

<Sample 12> cBN sintered material of sample 12 was produced in the same manner as sample 5, except that, in the second step, the heat treatment conditions for the commercially available cBN powder prepared as the cBN raw material powder were set to 1,200° C. and 10 hours, and the surface of the cBN raw material powder subjected to heat treatment was coated with Al by setting the shot number in the coating conditions to 5,000.

<Sample 13> cBN sintered material of sample 13 was produced in the same manner as sample 12, except that, in the second step, the surface of the cBN raw material powder subjected to heat treatment was coated with Al by setting the shot number in the coating conditions to 25,000.

<Sample 14> cBN sintered material of sample 14 was produced in the same manner as sample 5, except that, in the second step, heat treatment conditions for the commercially available cBN powder prepared as the cBN raw material powder were set to 1,400° C. and 20 hours, and the surface of the cBN raw material powder subjected to heat treatment was coated with Al by setting the shot number in the coating conditions to 50,000.

<Sample 15> cBN sintered material of sample 15 was produced in the same manner as sample 5, except that, in the second step, the heat treatment conditions for the commercially available cBN powder prepared as the cBN raw material powder were set to 1200° C. and 6 hours, and the surface of the cBN raw material powder subjected to heat treatment was coated with Al by setting the shot number in the coating conditions to 20,000.

<Sample 16> cBN sintered material of sample 16 was produced in the same manner as sample 15, except that, in the second step, the surface of the cBN raw material powder subjected to heat treatment was coated with Al by setting the shot number in the coating conditions to 35,000.

<Sample 17> cBN sintered material of sample 17 was produced in the same manner as sample 15, except that, in the second step, the surface of the cBN raw material powder subjected to heat treatment was coated with Al by setting the shot number in the coating conditions to 50,000.

<Sample 18> cBN sintered material of sample 18 was produced in the same manner as sample 5, except that, in the second step, the heat treatment conditions for the commercially available cBN powder prepared as the cBN raw material powder were set to 1,100° C. and 9 hours, and the surface of the cBN raw material powder subjected to heat treatment was coated with Al by setting the shot number in the coating conditions to 80,000.

<Sample 19> cBN sintered material of sample 19 was produced in the same manner as sample 5, except that, in the second step, the surface of the cBN raw material powder was coated with metals by changing one of two targets to Cr (purity: 99.999%) and changing the shot ratio of two targets (Al:Cr) to 499:1 (the shot number was 5,000), with respect to the coating conditions for coating the surface of the cBN raw material powder subjected to heat treatment with a metal.

<Sample 20> cBN sintered material of sample 20 was produced in the same manner as sample 19, except that, in the second step, the surface of the cBN raw material powder was coated with metals by changing the shot ratio of two targets (Al:Cr) to 99:1 (the shot number was 5,000).

<Sample 21> cBN sintered material of sample 21 was produced in the same manner as sample 19, except that, in the second step, the surface of the cBN raw material powder was coated with metals by changing the shot ratio of two targets (Al:Cr) to 9:1 (the shot number was 5,000).

<Sample 22> cBN sintered material of sample 22 was produced in the same manner as sample 19, except that, in the second step, the surface of the cBN raw material powder was coated with metals by changing the shot ratio of two targets (Al:Cr) to 7:3 (the shot number was 5,000).

<Sample 23> cBN sintered material of sample 23 was produced in the same manner as sample 19, except that, in the second step, the surface of the cBN raw material powder was coated with metals by changing the shot ratio of two targets (Al:Cr) to 6:4 (the shot number was 5,000).

<Sample 24> cBN sintered material of sample 24 was produced in the same manner as sample 19, except that, in the second step, the surface of the cBN raw material powder was coated with metals by changing the shot ratio of two targets (Al:Cr) to 5:5 (the shot number was 5,000).

<Sample 25> cBN sintered material of sample 25 was produced in the same manner as sample 19, except that, in the second step, the surface of the cBN raw material powder was coated with metals by changing the shot ratio of two targets (Al:Cr) to 4:6 (the shot number was 5,000).

<Sample 26> cBN sintered material of sample 26 was produced in the same manner as sample 21, except that, in the second step, one of two targets was changed from Cr to V (purity: 99.999%), with respect to the coating conditions for coating the surface of the cBN raw material powder subjected to heat treatment with a metal.

<Sample 27> cBN sintered material of sample 27 was produced in the same manner as sample 21, except that, in the second step, one of two targets was changed from Cr to Co (purity: 99.999%), with respect to the coating conditions for coating the surface of the cBN raw material powder subjected to heat treatment with a metal.

<Sample 28> cBN sintered material of sample 28 was produced in the same manner as sample 21, except that, in the second step, one of two targets was changed from Cr to Zr (purity: 99.999%), with respect to the coating conditions for coating the surface of the cBN raw material powder subjected to heat treatment with a metal.

<Sample 29> cBN sintered material of sample 29 was produced in the same manner as sample 21, except that, in the second step, one of two targets was changed from Cr to W (purity: 99.999%), with respect to the coating conditions for coating the surface of the cBN raw material powder subjected to heat treatment with a metal.

<Sample 30> cBN sintered material of sample 30 was produced in the same manner as sample 21, except that, in the second step, one of two targets was changed from Cr to Nb (purity: 99.999%), with respect to the coating conditions for coating the surface of the cBN raw material powder subjected to heat treatment with a metal.

<Sample 31> cBN sintered material of sample 31 was produced in the same manner as sample 21, except that, in the second step, one of two targets was changed from Cr to Hf (purity: 99.999%), with respect to the coating conditions for coating the surface of the cBN raw material powder subjected to heat treatment with a metal.

<Sample 32> cBN sintered material of sample 32 was produced in the same manner as sample 21, except that, in the second step, one of two targets was changed from Cr to Ta (purity: 99.999%), with respect to the coating conditions for coating the surface of the cBN raw material powder subjected to heat treatment with a metal.

<Sample 33> cBN sintered material of sample 33 was produced in the same manner as sample 21, except that, in the second step, one of two targets was changed from Cr to Re (purity:

99.999%), with respect to the coating conditions for coating the surface of the cBN raw material powder subjected to heat treatment with a metal.

<Sample 34> cBN sintered material of sample 34 was produced in the same manner as sample 21, except that, in the second step, one of two targets was changed from Cr to Si (purity: 99.999%), with respect to the coating conditions for coating the surface of the cBN raw material powder subjected to heat treatment with a metal.

<Sample 35> cBN sintered material of sample 35 was produced in the same manner as sample 21, except that, in the second step, one of two targets was changed from Cr to Mo (purity: 99.999%), with respect to the coating conditions for coating the surface of the cBN raw material powder subjected to heat treatment with a metal.

<Sample 36> cBN sintered material of sample 36 was produced in the same manner as sample 21, except that, in the second step, one of two targets was changed from Cr to Ti (purity: 99.999%), with respect to the coating conditions for coating the surface of the cBN raw material powder subjected to heat treatment with a metal.

[Evaluation]

<Measurement of Distance Between Particles D, Atom % of Al, and Ratio M1/(M+M1), and Assessment of Presence or Absence of First Region>

Each cBN sintered material of sample 1 to sample 18 was cut at any position, and the exposed surface was polished to produce a smooth surface. Thereafter, the smooth surface was sliced to have a thickness of 50 nm using an argon ion slicer. Then, the second image (100 nm×100 nm) was subjected to the elemental line analysis by TEM-EDX according to the method described above. The beam diameter in TEM-EDX was set to 0.2 nm, and the scanning interval was set to 0.6 nm. From the obtained measured values, the distance between particles D and the atom % of Al were determined, and the presence or absence of the first region was assessed according to the method described above. Specifically, the assessment of the presence or absence of the first region was carried out by observing arbitrary 10 second images for sample 1 to sample 18, and determining the sample for which six or more first regions were observed as "with first region" and the sample for which five or less first regions were observed as "without first region". For the sample "with first region", the average value of the distance between particles D obtained from the elemental line analysis on six or more first regions that are specified as the first region was determined. Further, the atom % of Al was determined from the average value of the maximum value of the peak of Al obtained by the elemental line analysis. The results are shown in Table 1. Sample 2 to sample 7 and sample 11 to sample 18 are Examples, and sample 1 and sample 8 to sample 10 are Comparative Examples.

Since the bonding material was not present in sample 8, the measurable first region was not detected. For sample 9, the distances between particles D were more than 10 nm in all elemental line analyses that were carried out on arbitrarily extracted regions where a structure like an interface of cBN particles is formed.

Further, the second image (100 nm×100 nm) was obtained with respect to cBN sintered materials of sample 19 to sample 36, in the same manner as cBN sintered materials of sample 1 to sample 18, and the second image was subjected to elemental line analysis by TEM-EDX. From the obtained measured values, the distance between particles D, the atom % of Al, and the ratio M1/(M+M1) were determined, and the presence or absence of the first region was assessed according to the method described above. The results are shown in Table 2. Sample 19 to sample 36 are Examples. In Table 2, the results of sample 5 and sample 10 are also shown to show the results of the cutting test described later.

<First Cutting Test>

From each cBN sintered material of sample 1 to sample 18, cutting tools made of each sample (base material shape: SNGN090308, cutting edge treatment: T01225) were produced. The cutting test (first cutting test) was carried out under the following cutting conditions by using these cutting tools.

<Cutting Conditions>

Cutting speed: 1,500 m/min.
Feeding speed: 0.2 mm/rev.
Depth of cut: 0.8 mm
Coolant: WET
Coolant liquid: Emulsions 96 (diluted to 20-fold with water)
Cutter: RM3080R (manufactured by Sumitomo Electric Industries, Ltd.)
Cutting method: intermittent cutting
Lathe: NEXUS 530-II HS (manufactured by YAMAZAKI MAZAK CORPORATION)
Work material: FC250.

The cutting edge was observed every 0.5 km of the cutting distance, and the amount of the dropping of the cutting edge was measured. The amount of dropping of the cutting edge was taken as the width moved backward due to wear from the position of the cutting edge ridge before cutting. When the cutting edge was chipped, the size of chipping was taken as the amount of dropping. The cutting distance at the time when the amount of dropping of the cutting edge reached 0.1 mm or more was measured. The cutting distance was taken as the lifetime of the cutting tool. The results are shown in Table 1. It can be evaluated that the longer the cutting distance becomes, the more the lifetime of the cutting tool is prolonged.

<Second Cutting Test>

From each cBN sintered material of sample 5, sample 10, and sample 19 to sample 36, cutting tools made of each sample (base material shape: TNGA160404, cutting edge treatment: T01225) were produced. The cutting test (second cutting test) was carried out under the following cutting conditions by using these cutting tools.

<Cutting Conditions>

Cutting speed: 250 m/min.
Feeding speed: 0.15 mm/rev.
Depth of cut: 0.1 mm
Coolant: DRY
Cutting method: continuous cutting
Lathe: LB400 (manufactured by Okuma Corporation)
Work material: sintered part (hardened sintered alloy D40 manufactured by Sumitomo Electric Industries, Ltd., the hardness of the hardened cutting part: HRB75).

The cutting edge was observed every 0.3 km of the cutting distance, and the amount of wear of the cutting edge was measured. The cutting distance at the time when the amount of wear of the cutting edge reached 100 μm or more was measured. The cutting distance was taken as the lifetime of the cutting tool. The results are shown in Table 2. It can be evaluated that the longer the cutting distance becomes, the more the lifetime of the cutting tool is prolonged.

TABLE 1

| Sample No. | cBN content [vol %] | Presence or absence of first region | Distance between particles D [nm] | Al concentration [atom %] | Average cutting distance [km] |
|---|---|---|---|---|---|
| 1 | 60 | Yes | 4.4 | 2.2 | 0.7 |
| 2 | 70 | Yes | 3.5 | 2.4 | 2.0 |
| 3 | 75 | Yes | 3.4 | 0.3 | 1.6 |
| 4 | 80 | Yes | 2.2 | 2.1 | 2.3 |
| 5 | 89 | Yes | 2.1 | 1.9 | 2.5 |
| 6 | 95 | Yes | 2.1 | 1.7 | 2.4 |
| 7 | 99 | Yes | 1.5 | 0.7 | 2.1 |
| 8 | 100 | No | — | — | 0.5 |
| 9 | 70 | No | — | — | 0.7 |
| 10 | 89 | Yes | 1.8 | 0.0 | 0.7 |
| 11 | 95 | Yes | 0.1 | 0.1 | 1.8 |
| 12 | 89 | Yes | 2.2 | 0.5 | 2.4 |
| 13 | 89 | Yes | 3.9 | 2.9 | 2.5 |
| 14 | 89 | Yes | 5.9 | 12 | 2.6 |
| 15 | 89 | Yes | 7.0 | 3.2 | 2.4 |
| 16 | 89 | Yes | 8.4 | 4.2 | 2.1 |
| 17 | 89 | Yes | 10.0 | 6.7 | 2.0 |
| 18 | 89 | Yes | 9.8 | 15 | 2.1 |

TABLE 2

| Sample No. | cBN content [vol %] | Presence or absence of first region | Distance between particles D [nm] | Al concentration [atom %] | Element M1 contained in adhesion layer | Ratio M1/(M + M1) | Average cutting distance [km] |
|---|---|---|---|---|---|---|---|
| 5 | 89 | Yes | 2.1 | 19 | No | — | 1.6 |
| 10 | 89 | Yes | 1.8 | 0.0 | No | — | 0.7 |
| 19 | 89 | Yes | 1.7 | 2.0 | Cr | 0.0052 | 2.1 |
| 20 | 89 | Yes | 2.0 | 1.9 | Cr | 0.010 | 3.2 |
| 21 | 89 | Yes | 1.9 | 1.8 | Cr | 0.11 | 3.4 |
| 22 | 89 | Yes | 1.7 | 1.3 | Cr | 0.30 | 3.3 |
| 23 | 89 | Yes | 1.8 | 1.1 | Cr | 0.39 | 2.2 |
| 24 | 89 | Yes | 2.1 | 1.0 | Cr | 0.50 | 2.2 |
| 25 | 89 | Yes | 2.0 | 0.71 | Cr | 0.61 | 1.5 |
| 26 | 89 | Yes | 2.0 | 1.8 | V | 0.10 | 3.2 |
| 27 | 89 | Yes | 2.1 | 1.8 | Co | 0.10 | 3.1 |
| 28 | 89 | Yes | 2.2 | 2.0 | Zr | 0.11 | 3.5 |
| 29 | 89 | Yes | 2.1 | 1.8 | W | 0.10 | 3.1 |
| 30 | 89 | Yes | 1.9 | 1.8 | Nb | 0.10 | 3.3 |
| 31 | 89 | Yes | 2.0 | 1.9 | Hf | 0.10 | 3.1 |
| 32 | 89 | Yes | 2.0 | 2.0 | Ta | 0.08 | 3.2 |
| 33 | 89 | Yes | 2.1 | 1.9 | Re | 0.09 | 3.3 |
| 34 | 89 | Yes | 2.2 | 1.7 | Si | 0.10 | 2.9 |
| 35 | 89 | Yes | 2.1 | 1.9 | Mo | 0.09 | 3.0 |
| 36 | 89 | Yes | 1.9 | 1.8 | Ti | 0.10 | 3.5 |

CONSIDERATION

According to Table 1, it is recognized that the cutting tools obtained from each cBN sintered material of sample 2 to sample 7 and sample 11 to sample 18 which are Examples have a prolonged lifetime as compared with the cutting tools obtained from each cBN sintered material of sample 1 and sample 8 to sample 10 which are Comparative Examples.

According to Table 2, it is recognized that the cutting tools obtained from each cBN sintered material of sample 5 and sample 19 to sample 36 which are Examples have a prolonged lifetime as compared with the cutting tools obtained from each cBN sintered material of sample 10 which is a Comparative Example.

Although the embodiments and Examples of the present disclosure have been described above, it is also planned from the beginning to appropriately combine the configurations of the embodiments and Examples described above.

The embodiments and Examples disclosed herein should be considered to be exemplary in all respects and not restrictive. The scope of the present invention is shown by the scope of claims rather than the embodiments and Examples described above, and is intended to include the meaning equivalent to the scope of claims and all modifications within the scope.

The invention claimed is:

1. A cubic boron nitride sintered material comprising: cubic boron nitride particles in an amount of 70 vol % or more and less than 100 vol %, and a bonding material, wherein
   the bonding material comprises an aluminum compound, and comprises cobalt as a constituent element;
   the cubic boron nitride sintered material has a first region in which a space between adjacent cubic boron nitride particles is 0.1 nm or more and 10 nm or less;
   when the first region is analyzed by using an energy dispersive X-ray analyzer equipped with a transmission electron microscope, an atom % of aluminum in the first region is 0.1 or more; and
   the first region is observed in 6 or more among 10 images of 100 nm×100 nm in size that are generated by imaging, at a magnification of 2,000,000×, a region in which a structure like an interface of the adjacent cubic boron nitride particles is formed in the cubic boron nitride sintered material.

2. The cubic boron nitride sintered material according to claim 1, wherein when the space between adjacent cubic boron nitride particles in the first region is 0.1 nm or more and 7.0 nm or less, the atom % of aluminum in the first region is 0.5 or more.

3. The cubic boron nitride sintered material according to claim 1, wherein
   the first region comprises, as constituent elements, at least one or more first elements selected from the group consisting of chromium, titanium, vanadium, cobalt, zirconium, tungsten, niobium, hafnium, tantalum, rhenium, silicon, and molybdenum; and aluminum; and
   when the first region is analyzed by using the energy dispersive X-ray analyzer equipped with a transmission electron microscope, a ratio M1/(M+M1) is 0.50 or less where the atom % of aluminum is taken as M and the atom % of an element that is present at the highest concentration among the first elements is taken as M1.

4. The cubic boron nitride sintered material according to claim 3, wherein the ratio M1/(M+M1) is 0.010 or more and 0.30 or less.

5. The cubic boron nitride sintered material according to claim 1, wherein the cubic boron nitride sintered material comprises the cubic boron nitride particles in an amount of 80 vol % or more and 95 vol % or less.

6. A cutting tool comprising the cubic boron nitride sintered material according to claim 1.

7. The cubic boron nitride sintered material according to claim 2, wherein
the first region comprises, as constituent elements, at least one or more first elements selected from the group consisting of chromium, titanium, vanadium, cobalt, zirconium, tungsten, niobium, hafnium, tantalum, rhenium, silicon, and molybdenum; and aluminum; and
when the first region is analyzed by using the energy dispersive X-ray analyzer equipped with a transmission electron microscope, a ratio M1/(M+M1) is 0.50 or less where the atom % of aluminum is taken as M and the atom % of an element that is present at the highest concentration among the first elements is taken as M1.

8. The cubic boron nitride sintered material according to claim 7, wherein the ratio M1/(M+M1) is 0.010 or more and 0.30 or less.

9. The cubic boron nitride sintered material according to claim 2, wherein the cubic boron nitride sintered material comprises the cubic boron nitride particles in an amount of 80 vol % or more and 95 vol % or less.

10. The cubic boron nitride sintered material according to claim 3, wherein the cubic boron nitride sintered material comprises the cubic boron nitride particles in an amount of 80 vol % or more and 95 vol % or less.

11. The cubic boron nitride sintered material according to claim 4, wherein the cubic boron nitride sintered material comprises the cubic boron nitride particles in an amount of 80 vol % or more and 95 vol % or less.

12. The cubic boron nitride sintered material according to claim 7, wherein the cubic boron nitride sintered material comprises the cubic boron nitride particles in an amount of 80 vol % or more and 95 vol % or less.

13. The cubic boron nitride sintered material according to claim 8, wherein the cubic boron nitride sintered material comprises the cubic boron nitride particles in an amount of 80 vol % or more and 95 vol % or less.

14. A cutting tool comprising the cubic boron nitride sintered material according to claim 2.

15. A cutting tool comprising the cubic boron nitride sintered material according to claim 3.

16. A cutting tool comprising the cubic boron nitride sintered material according to claim 4.

17. A cutting tool comprising the cubic boron nitride sintered material according to claim 5.

18. A cutting tool comprising the cubic boron nitride sintered material according to claim 7.

19. A cutting tool comprising the cubic boron nitride sintered material according to claim 8.

20. A cutting tool comprising the cubic boron nitride sintered material according to claim 9.

* * * * *